No. 659,701. Patented Oct. 16, 1900.
R. P. SCOTT.
PNEUMATIC TIRE.
(Application filed July 20, 1900.)
(No Model.)
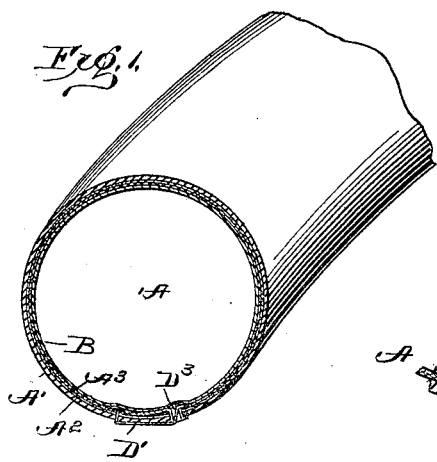
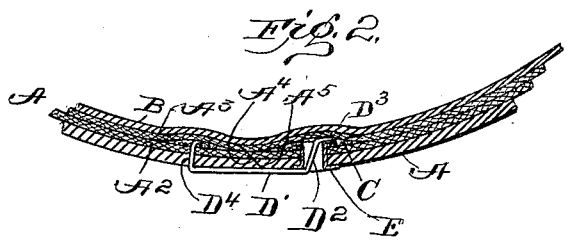
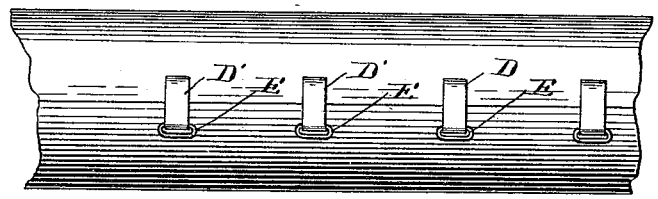
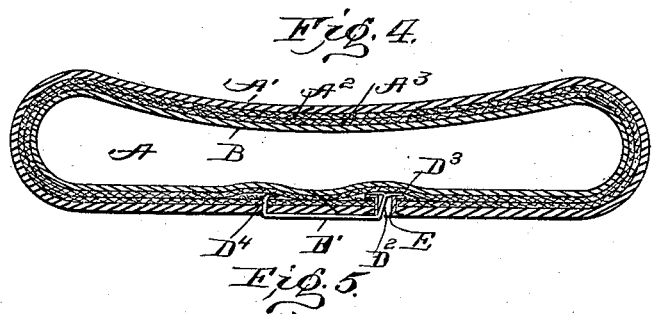
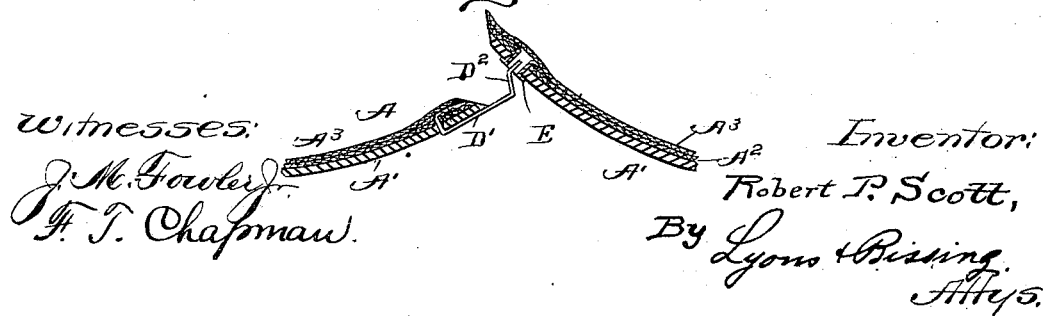
Witnesses:
J. M. Fowler
F. T. Chapman
Inventor:
Robert P. Scott,
By Lyons & Bissing
Attys.

UNITED STATES PATENT OFFICE.

ROBERT P. SCOTT, OF CADIZ, OHIO.

PNEUMATIC TIRE.

SPECIFICATION forming part of Letters Patent No. 659,701, dated October 16, 1900.

Application filed July 20, 1900. Serial No. 24,322. (No model.)

*To all whom it may concern:*

Be it known that I, ROBERT P. SCOTT, a citizen of the United States, and a resident of Cadiz, in the county of Harrison and State of Ohio, have invented certain new and useful Improvements in Pneumatic Tires, of which the following is a specification.

My invention is in the nature of an improvement on the type of automatically attachable and detachable pnematic tires shown and described in Letters Patent of the United States to Charles S. Scott, No. 608,273, of August 2, 1898. By reference to this patent it will be seen that the pneumatic tire there described is of a type in which a band of shrinkable metal fabric, preferably diagonally-woven-wire fabric, is secured to each side of the shoe of the tire. When a tire provided with such primarily-flexible bands is placed upon a wheel-rim in such a manner that the edges of the band are respectively above and below the rim edges of the wheel, it has been found that the inflation of the tire causes a distortion of the bands into frusto-conical shape, which distortion makes the bands rigid edgewise. This in itself would prevent the tire when inflated from being forced from the wheel. In addition to this the contraction of the lower edges of the metal bands causes these bands to grip the wheel-rim by radially-contracting pressure. It is also found that the extended outer edges of the band form a rigid base-line against which the part of the tire between them and the rim can expand against the rim, thus still further securing the tire to the rim. The result is that all creeping of the tire and all tendency of the tire to creep is prevented. This result it is believed has never before been reached in an automatically-attachable pneumatic tire.

The patent just referred to comprehended within its provisions pneumatic tires both of the single-tube and double-tube variety. In so far as a double-tube tire was illustrated in the drawings of that patent the two edges of the outer shoe which meet at the center of the wheel-rim were locked together by what might be called a "continuous hook," being, in fact, a groove of rectangular cross-section on one edge of the outer shoe and a flange or bead of corresponding cross-section fitting into the groove on the other edge of the shoe. Such continuous locking device for the two edges of the outer shoe is quite satisfactory. The only trouble is that it can only be used on comparatively expensive tires, since it must be made on what is known in the art of rubber manufacture as a "drum," upon which the tire before vulcanization is drawn down by canvas and wire wrapping together with steel draw bands and bolts.

It is the object of my invention to replace the continuous hook of the patent referred to by a series of metal catches of such a character that the tire can be made by a cheap process, that the series of catches can each be fastened with the utmost readiness, and, in fact, almost automatically, that when fastened the catches will stay fastened so long as the tire remains inflated, or even when the tire is uninflated, unless it be distorted into a position into which it will not normally fall of its own accord, and which can be readily unhooked by merely distorting the tire into the proper position.

In the drawings, Figure 1 is a sectional perspective of a tire embodying my invention. Fig. 2 is an enlarged section of the catch and eyelet and surrounding parts of the outer shoe. Fig. 3 is a plan of the catches. Fig. 4 is a section of the shoe when uninflated, and Fig. 5 is a section showing the position of the parts when the catches are to be hooked into position.

The outer shoe A consists of an outer rubber cover or jacket A' and two layers of canvas $A^2$ $A^3$ adjacent thereto. The shrinkable bands of metal or woven-wire fabric C are secured in place between the two layers of canvas. The two edges of the outer shoe A meet at the center of the wheel-rim along a bevel or scarf joint formed by two tongues $A^4$ $A^5$. All this is just as in the prior patent, and it may be said at this point that although I have described the outer shoe as comprising two layers of canvas and an outer layer of rubber, it is possible to make the shoe of a single layer of canvas, and it is furthermore possible to have the rubber covering along the tread portion of the shoe only.

The catch D is provided with a hook part $D^4$, which is passed through the material of the shoe and the shrinkable band C and is thereupon clenched upon the inside of the shoe. Connected to the part $D^4$ is the stiff bar or connecting-piece $D'$, which must be long enough to bridge the space between the two metal bands C, embedded in the edges of the shoe. A tongue consisting of two parts $D^2 D^3$ is connected to the bar $D'$. The part $D^3$ is substantially parallel with and runs in the same direction as the connecting-piece $D'$. In fact, the parts $D^2 D^3$ constitute a forwardly-projecting tongue in a different but approximately-parallel plane from that of the connecting-piece $D'$. Naturally the degree of approximation to parallelism is not of the essence of the matter, since a little extra bite might be given by a slightly-downward trend of the part $D^3$. It will be observed that the part $D^2$ makes an obtuse angle with the parts $D'$ and $D^3$. It is to be understood that these parts $D' D^2 D^3$ of the catch D are made of stiff metal, which retains its shape as against any pressure likely to be put upon it in the operation of the tire.

An eyelet E, which is preferably employed, is shown as clenched to the outer shoe through the outer rubber covering $A'$, the canvas layer $A^2$ adjacent to it, and the shrinkable band C. It is not shown as passing through the inner layer of canvas $A^3$. The idea is that the tongue $D^3$ is to lie between the inside face of the canvas strip $A^3$ and the lateral upper edge of the eyelet. This is done in order to prevent the inflatable inner tube B, of soft rubber, which serves to hold the compressed air which acts to expand the tire, from coming into direct contact with the metallic tongue $D^3$. Any such contact would be liable to wear a hole in the thin inner rubber tube B. Manifestly, however, the same result can be obtained by clenching the eyelet E through the outer rubber covering $A'$ and both layers of canvas $A^2 A^3$ and in cementing the edges of an extra canvas patch around the edges of the eyelet, which would also act to prevent direct contact of the tongue $D^3$ with the inner tube B.

Now it is a fact that a pneumatic tire when constructed in the manner indicated collapses into a shape very closely resembling that shown in Fig. 4, with the two tongues $A^4 A^5$ of the scarf-joint of the outer shoe having a tendency to remain in the same plane—that is to say, while the two tongues $A^4 A^5$ when the tire is uninflated have no pronounced tendency to lie in any given position measured laterally with respect to each other they have a pronounced tendency to lie in the same plane. So long as you keep the two tongues $A^4 A^5$ in the same plane you may move them together by, say, a quarter of an inch or a half an inch or you may pull them apart by that distance and the tongues will have no tendency to return to their original position; but if you distort the two tongues from a position in which they lie in the same plane, as shown in Fig. 4, to a position in which they lie in different planes and make a reëntrant angle with each other, as shown in Fig. 5, then there is a very forcible tendency for the tongues $A^4 A^5$ to return to the position in which they lie in the same plane. I may say at this point that the fact was only properly appreciated by me after I had made a long series of experiments with hooks of all kinds having a backwardly-extending curve—a hook such as would be formed from that shown in my drawings if the part $D^3$ were turned in the opposite direction. All hooks of this shape are useless on the outer shoe of a pneumatic tire of the kind I have described, for the reason that after one hook of the series of hooks around the shoe has been fastened there is nothing to hold it fastened while the other hooks are being secured and before the tire is inflated. I have discarded many types of hooks for this reason. With them the operator only succeeds in fastening a few of the many hooks around the inside of the outer shoe at one point in order to have an equal number of hooks come unfastened at another point. Besides such types of hooks pull on one side of the woven-wire bands C and interfere with its proper operation.

While speaking of this subject I may say that such catches as are used in glove-fasteners, comprising a plug and hollow button or a lacing, are impractical because they are too thick and act to bulge up the tire in spots, which has a bad effect on the inner tube.

It is thought that the operation and advantages of my invention will now be understood. In order to assemble the parts of the tire, the inner tube B is placed within the outer shoe, the edges of which are now to be locked together by the catches D. In order now to secure the two shoe edges or tongues $A^4 A^5$ of the shoe together, it is merely necessary to catch hold of one tongue with one hand and the other tongue with the other hand and to distort the two tongues toward the inside of the shoe until they make a reëntrant angle with each other, about as shown in Fig. 5. The tongue $D^3$ is then ready to slip of its own accord into the eyelet E, and when the pressure of the hand is released the two tongues $A^4 A^5$ fly back into a position in which they are in the same plane, such as shown in Fig. 4. After this there is no more danger of the catch becoming unhooked by accident. The nature of the strain of the two tongues $A^4 A^5$ with respect to each other is such as to keep a pressure upon the parts, which tends to keep the catch in place and to its work. All this applies during the time when the tire is off the rim and the inner tube D is flat and uninflated—that is to say, it applies when the operator has placed his inner tube within the outer shoe and is locking the catches, which are placed around the outer shoe preparatory to placing the shoe, with the inner tube therein, upon the wheel-rim for the purpose of inflating the tire. When the tire is inflated, it is seen at once that the pressure of the inner tube against the canvas layer $A^3$ and on the tongue $D^3$, forcibly holds said tongue to its work and this without putting any strain on the metal band or woven-wire fabric C which would in any way tend to distort or injure the band or prevent it from properly performing its function.

What I claim is—

1. An automatically-attachable pneumatic tire having primarily-flexible bands secured in its sides, and a series of catches secured to one of the bands and passing through apertures in the other band, said catches comprising a connecting-bar and a forwardly-projecting tongue in approximately-parallel planes, substantially as described.

2. An automatically-attachable pneumatic tire having primarily-flexible bands secured in its sides, a series of eyelets secured to one of the bands, and a series of catches secured to the other band and passing through the eyelets, said catches comprising a connecting-bar and a forwardly-projecting tongue in approximately-parallel planes.

In testimony whereof I have signed my name to this specification in the presence of two subscribing witnesses.

ROBERT P. SCOTT.

Witnesses:
JOHN C. SANDERS,
C. L. BUCKINGHAM.